(12) United States Patent
Roskilly et al.

(10) Patent No.: US 10,871,106 B2
(45) Date of Patent: Dec. 22, 2020

(54) FREE PISTON ENGINE POWER PLANT

(71) Applicant: University of Newcastle upon Tyne, Tyne and Wear (GB)

(72) Inventors: Anthony Paul Roskilly, Tyne and Wear (GB); Rikard Mikalsen, Tyne and Wear (GB)

(73) Assignee: University of Durham, Durham (GB)

( * ) Notice: Subject to any disclaimer, the term of this patent is extended or adjusted under 35 U.S.C. 154(b) by 0 days.

(21) Appl. No.: 15/770,208

(22) PCT Filed: Oct. 21, 2016

(86) PCT No.: PCT/GB2016/053308
§ 371 (c)(1),
(2) Date: Apr. 22, 2018

(87) PCT Pub. No.: WO2017/068374
PCT Pub. Date: Apr. 27, 2017

(65) Prior Publication Data
US 2019/0055898 A1    Feb. 21, 2019

(30) Foreign Application Priority Data
Oct. 23, 2015  (GB) .................................. 1518833.7

(51) Int. Cl.
*F02B 71/00* (2006.01)
*F02B 41/10* (2006.01)
(Continued)

(52) U.S. Cl.
CPC .............. *F02B 71/00* (2013.01); *F01B 11/00* (2013.01); *F01B 11/004* (2013.01); *F01B 11/02* (2013.01);
(Continued)

(58) Field of Classification Search
CPC ...... F02G 1/0435; F02G 5/02; F02G 2254/15; F02G 2244/50; F02B 71/04; F02B 41/00;
(Continued)

(56) References Cited

U.S. PATENT DOCUMENTS 3,693,347 A * 9/1972 Kydd .................... F01K 21/047
60/775
3,998,049 A 12/1976 McKinley et al.
(Continued)

FOREIGN PATENT DOCUMENTS

CN      102418594 A    4/2012
CN      102536453 A    7/2012
(Continued)

OTHER PUBLICATIONS

International Search Report and Written Opinion dated May 22, 2017 in PCT/GB2016/053308.
(Continued)

*Primary Examiner* — Mark A Laurenzi
*Assistant Examiner* — Xiaoting Hu
(74) *Attorney, Agent, or Firm* — Troutman Pepper Hamilton Sanders LLP; Ryan A. Schneider

(57) ABSTRACT

A free-piston engine power plant incorporating a first combustion cylinder, having a first combustion piston, a fluid expander having an expansion cylinder with an expander piston therein, the expander piston reciprocating in unison with the first combustion piston, a bottoming cycle having a working fluid and a heat exchanger.

7 Claims, 5 Drawing Sheets

(51) Int. Cl.
*F01B 11/00* (2006.01)
*F02B 71/06* (2006.01)
*F01K 23/06* (2006.01)
*F02B 71/04* (2006.01)
*F02G 1/043* (2006.01)
*F02G 5/02* (2006.01)
*F01B 11/02* (2006.01)
*F01N 5/04* (2006.01)
*F02B 37/00* (2006.01)

(52) U.S. Cl.
CPC .............. *F01K 23/065* (2013.01); *F01N 5/04* (2013.01); *F02B 41/10* (2013.01); *F02B 71/04* (2013.01); *F02B 71/06* (2013.01); *F02G 1/0435* (2013.01); *F02G 5/02* (2013.01); *F02B 37/00* (2013.01); *F02G 2244/50* (2013.01); *Y02E 20/14* (2013.01); *Y02T 10/12* (2013.01)

(58) Field of Classification Search
CPC ........ F02B 37/00; F02B 73/00; F02B 75/002; F02B 47/02; F02B 41/10; F02B 71/00–06; F01K 23/065; F01B 11/001; F01B 11/002; F01B 11/003; F01B 11/004; F01B 11/02; F01B 11/00–08; Y02E 20/14; F01N 5/00–5/04
See application file for complete search history.

(56) References Cited

U.S. PATENT DOCUMENTS

| | | | |
|---|---|---|---|
| 4,653,273 A | 3/1987 | David | |
| 8,661,816 B2 * | 3/2014 | Mathews | ................ F01N 5/02 123/25 P |

FOREIGN PATENT DOCUMENTS

| | | | | |
|---|---|---|---|---|
| DE | 102014100545 A1 * | 7/2015 | ............... | F01K 7/36 |
| DE | 102014100545 A1 | 7/2015 | | |
| GB | 583843 A | 1/1947 | | |
| GB | 2480461 A | 11/2011 | | |
| JP | 06101495 A * | 4/1994 | | |
| WO | 9943936 A1 | 9/1999 | | |
| WO | 2014018173 A1 | 1/2014 | | |

OTHER PUBLICATIONS

Search Report Under Section 17(5) dated Apr. 13, 2016 in GB1518833.7.
Search Report Under Section 17(6) dated May 17, 2016 in GB1518833.7.
Office Action issued in Chinese Application No. CN2016800620938 dated Dec. 4, 2019.

* cited by examiner

FREE PISTON ENGINE POWER PLANT

There is disclosed a free-piston engine power plant. In particular, there is disclosed a free-piston engine power plant incorporating means for improving control and efficiency of the free-piston engine.

BACKGROUND

Free-piston engines are linear engines, in which the reciprocating engine has substantially no rotating parts. Power take-out can be done via a linear energy conversion device, for example a linear electric generator or hydraulic pump, or via an exhaust gas turbine. A review of different free-piston engine configurations was presented in: Mikalsen R., Roskilly A. P; A review of free-piston engine history and applications; Applied Thermal Engineering, 2007; 27:2339-2352. An overview of some recent free-piston engine developments was presented in: Hanipah M. R., Mikalsen R., Roskilly A. P; Recent commercial free-piston engine developments for automotive applications; Applied Thermal Engineering, 2015; 75:493-503.

A challenge in free-piston engines is the control of the piston motion, since the piston assembly is not restrained in its motion by a crank mechanism but will move freely under the influence of the different forces acting on it at any given time. In free-piston gas generators, a further challenge is the matching of the (reciprocating) free-piston combustion engine with the (rotodynamic) power turbine. This is because the pulsating flow from the engine is not ideal for a turbine, which provides best efficiency under steady flow conditions.

Embodiments of the present invention seek to provide a free-piston engine power plant with improved performance compared with known systems, including improved controllability and operational flexibility, and higher fuel efficiency.

Embodiments of the present invention is to provide a free-piston engine power plant with improved performance compared with known systems, including improved controllability and operational flexibility, and higher fuel efficiency.

BRIEF SUMMARY OF THE DISCLOSURE

In accordance with a first aspect, there is provided a free-piston engine power plant, comprising:

a first combustion cylinder, having a first combustion piston fixed to a shaft;

a fluid expander comprising an expansion cylinder with an expander piston therein, the expander piston being fixed to the shaft for reciprocating in unison with the first combustion piston;

a bottoming cycle having a working fluid; and a heat exchanger adapted to transfer heat from an exhaust stream of the first combustion cylinder to the working fluid;

wherein the fluid expander is adapted to work as an expander for the working fluid and wherein valves are provided to control the flow of the working fluid into and out of the fluid expander.

Advantageously, providing a fluid expander with an expander piston fixed to the reciprocating shaft and valves to control the flow of the working fluid in and out of the fluid expander permits the fluid expander to be used to aid piston motion control in the free-piston engine power plant.

By controlling the valves to either supply or discharge working fluid from the expansion cylinder, or alternatively close off the expansion cylinder to provide a bounce chamber, the fluid expander reduces the risk of deviation from dead centre positions. This reduces the risk of mechanical contact between the piston(s) and the cylinder head, which could be catastrophic for the engine, as well as improves engine operational stability, for example under influence of cycle-to-cycle variations in the combustion processes.

Moreover, this control can be realised without a net energy cost, as the exhaust heat is used in the fluid expander. By using the exhaust heat in this manner, a net surplus energy to the system is obtained. The net surplus energy from the fluid expander contributes to the compression work in the combustion cylinders, and thus increases the net energy output from the combustion cylinders.

Preferably, the bottoming cycle may be configured to act on a Rankine cycle.

Advantageously, this provides an efficient conversion of heat from the exhaust stream, with a high pressure ratio, ensuring that the fluid expander can provide high forces on the piston assembly and thus more effective control, e.g. during transient operation.

Optionally, the expander piston is a double-acting steam cylinder.

Advantageously, this allows force from the fluid expander to be applied to the shaft in both directions.

Optionally, the free-piston engine power plant may be further provided with a linear energy conversion device. The linear energy conversion device may be provided on the shaft and the linear energy conversion device may include a translator element coupled to the shaft.

Preferably, the linear energy conversion device is an electric machine.

Advantageously, this permits net cycle work to be extracted directly as, for example, electric energy. In particular, the net surplus energy from the bottoming cycle can be extracted via the same energy conversion device as the combustion cylinders, thus obviating the need for a separate energy conversion device to utilise or recover exhaust gas energy in a bottoming cycle and thereby reducing cost of the power plant.

Optionally, the power plant may be further provided with a second combustion cylinder having a second combustion piston fixed to the shaft, also configured to transfer heat to the working fluid through the heat exchanger. Advantageously, this improves power density of the power plant, while the fluid expander can be used to avoid control challenges normally faced by such dual piston free-piston engine systems, including cycle-to-cycle variations and unstable performance during load transients.

Optionally, the power plant may be further provided with a power turbine. The power turbine may be arranged to receive a supply of exhaust gas from a combustion chamber.

Advantageously, providing a bottoming cycle contributes a net amount of work to a compression stroke in the combustion engine, thus providing more energy in the exhaust gas stream provided to the turbine, thereby producing more power.

In a further aspect, there is disclosed a free-piston gas generator power plant, comprising:

a free-piston engine; and a power turbine;

wherein the free-piston engine is arranged to supply exhaust gases to the power turbine via an exhaust channel, and wherein a water injector is provided to inject water into the exhaust channel at a predetermined water injection frequency.

Advantageously, this minimises fluctuations in the rate of flow of exhaust gases through the power turbine, thus improving efficiency of the power plant.

Preferably, the predetermined water injection frequency is coupled to complement the operating frequency of the engine. Advantageously, this allows the water injection to operate according to the engine operating conditions and takes into account variations in the flow rate of exhaust gases.

Preferably, the water injector is adapted to vary a flow rate of the water injected into the exhaust channel according to a measured operating frequency of the free-piston engine. Optionally, the flow rate of the water may be controlled to continuously vary, like a sinusoidal waveform, or the flow rate may be controlled in a pulsating on/off manner. The timing of the pulses may be adapted to complement a desired phase in relation to an operating frequency of the engine, and the frequency of the pulses may be configured to match that of the engine.

Optionally, the free-piston gas generator power plant is further provided with a water pump for increasing pressure to the water injector. Advantageously, this improves the injector performance, for example the responsiveness of the injector, and the available rate of injection, and further improves atomisation/distribution of water within the exhaust stream.

Optionally, the injector comprises a nozzle to atomise water being injected into the exhaust channel. Advantageously, one or both of these ensure effective evaporation of the water in the exhaust stream.

According to a further aspect, there is provided a free-piston gas generator power plant, comprising:
  a free-piston engine;
  a power turbine;
  the free-piston engine configured to supply an exhaust gas to the power turbine via an exhaust channel;
  the power plant being further provided with a water supply, a heat exchanger and an injector;
  wherein the heat exchanger is coupled to an exhaust line from the power turbine, the exhaust line being arranged to heat the water supply to create steam, the injector arranged to inject the steam into the exhaust channel.

Advantageously, this improves overall power plant efficiency and power output from the power turbine, as exhaust gas heat is utilised to improve fluid flow through the turbine.

Preferably, an injection valve may be provided to control the rate of steam injection into the exhaust channel. Advantageously, the inject value provides a control of the rate of steam entering the exhaust channel and thereby contributes to controlling the power produced by the power turbine.

Furthermore, this permits control of the amount of steam injected and thus allows load control of the turbine. This may adapt the operation according to the (external) demand at any time. By controlling the rate of steam injection, such load variations will not be seen, or will have less influence, on the free-piston engine. This reduces one of the known challenges with the free-piston engine, namely its capability to cope with rapid load variations.

Optionally, the injection valve is configured to inject water into the exhaust channel at a predetermined water injection frequency. Advantageously, this pulsating steam injection can counteract pressure variations experience by the power turbine.

Optionally, a water pump is provided for increasing pressure in water injector.

Optionally, the water injector comprises a nozzle to atomise water being injected into the exhaust channel.

Optionally, a portion of the steam is diverted to form a second steam path. Advantageously, this allows excess steam to be utilised for other purposes.

Optionally, a second steam path injector and a second steam path valve may be provided on the second steam path to control the amount of steam supplied to the second path. Advantageously, this permits the use of steam for load control of the power plant, while at the same time utilising excess energy for other purposes, and allows the power plant to adapt its operation according to any given operational requirements.

BRIEF DESCRIPTION OF THE DRAWINGS

Embodiments of the invention are further described hereinafter with reference to the accompanying drawings, in which.

DETAILED DESCRIPTION

Figure 1:
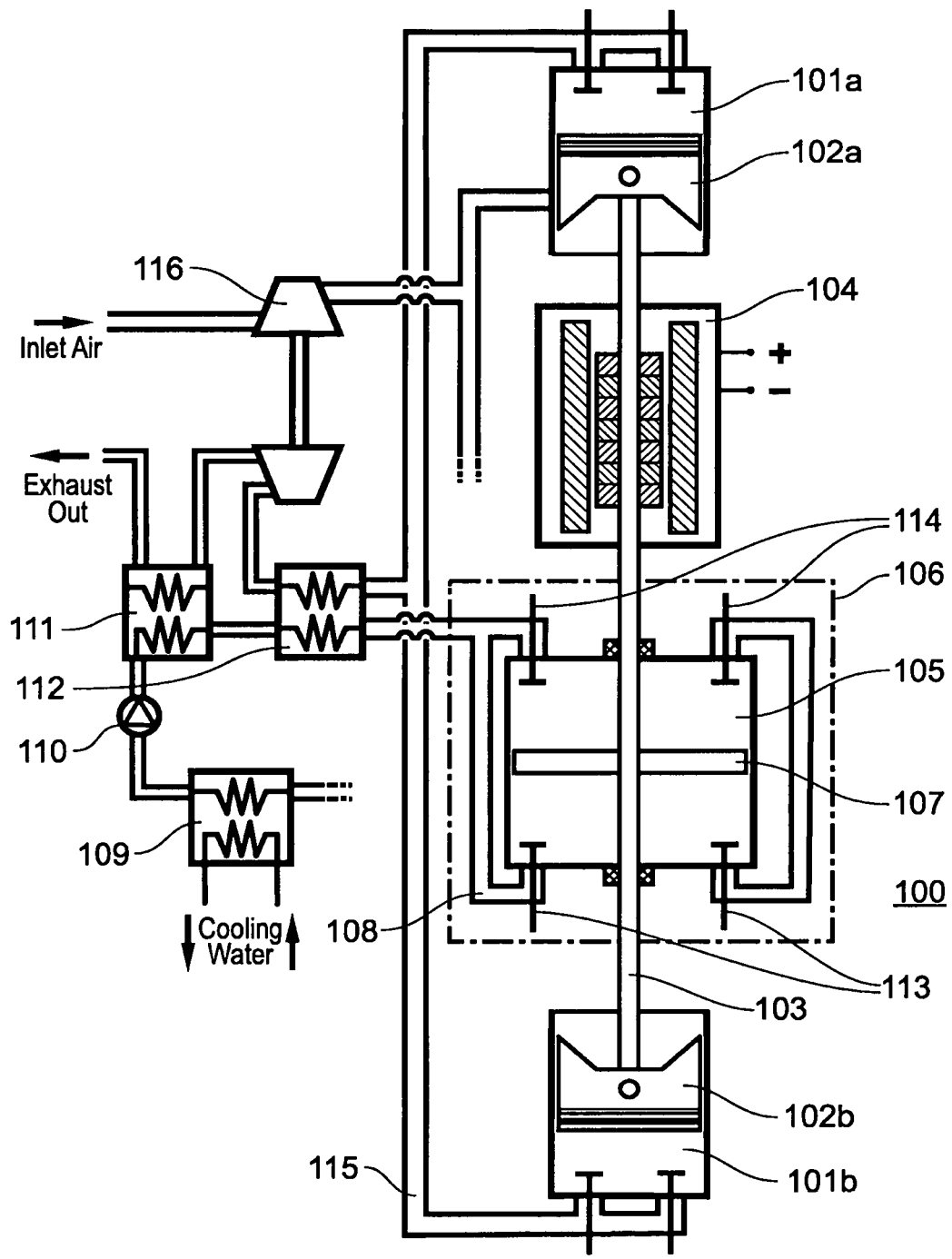
FIG. 1 shows an example of a free-piston engine power plant.

FIG. 1 shows a free-piston engine power plant 100. The free-piston engine power plant comprises two combustion cylinders 101a and 101b, each having an associated combustion piston 102a and 102b. The combustion pistons 102a and 102b are connected rigidly by shaft 103. Furthermore, the free-piston engine power plant comprises an electric machine 104, the electric machine having a translator fixed to the shaft 103 and a stator fixed in a stationary position relative to the shaft 103, for example, on the power plant housing (not shown).

When the combustion cylinders 101a and 101b operate alternately, the piston assembly is driven back and forth, and excess energy from the combustion cycles can be extracted through the electric machine.

The free-piston engine power plant 100 further comprises a bottoming cycle. In the embodiment shown in FIG. 1, this is a Rankine cycle. For the purposes of the FIG. 1, it shall be assumed that this is a water-based steam cycle, however other types of working fluid is equally possible, for example such fluids used in organic Rankine cycles. Alternative bottoming cycle working principles may include a Brayton cycle, or other thermodynamic cycles as appropriate for given design requirements.

The steam-based bottoming cycle has a fluid expander 105. The fluid expander 105 comprises a fluid expander piston 107 arranged in a fluid expander cylinder 106 and coupled rigidly to the shaft 103. Thus, the fluid expander piston 107 will reciprocate with the shaft 103 and the combustion pistons 102a and 102b. A fluid channel 108 transfers a working fluid of the bottoming cycle. The working fluid is transferred through a condenser 109 where the steam is condensed by means of e.g. cooling water; a water pump 110 is provided to increase the pressure of the condensed working fluid; a boiler 111 is provided to heat the working fluid; and, optionally, a superheater 112 is provided to further increase the temperature of the working fluid. From the superheater 112 the working fluid is passed to the fluid expander 105. Valves 113 and 114 control the inlet and outlet of working fluid to and from the fluid expander cylinder 106. The valves 113 and 114 may be actively controlled based on the instantaneous piston position and, optionally, other operational variables such as piston speed and/or acceleration. This can be implemented, for example, with a linear encoder and conventional valve actuators, for example, electro-mechanically driven. Thus, the bottoming cycle, via the fluid expander 105, can provide a work on the shaft 103. This work will contribute to the piston motion control in the free-piston power plant and provide a net surplus work which can be extracted through the electric machine 104.

The bottoming cycle is driven by exhaust from the combustion cylinders 101a and 101b. Exhaust gases from the combustion cylinders 101a and 101b are led via an exhaust channel 115 to the superheater 112 where the exhaust gases may exchange heat with the working fluid, then the exhaust gases are led through a turbocharger turbine 116, then through the boiler 111, before being discharged from the power plant.

In this manner, exhaust gas heat, which would otherwise be lost, can be used to produce a net work on the shaft 103 and thus allow part of the exhaust gas heat to be recovered an extracted as output electric work via the electric machine 104. This arrangement of a bottoming cycle provides substantial advantages over a conventional arrangement having a bottoming cycle with a separate expander (e.g. a scroll expander) with its own electric generator. As such, there is no requirement for a separate electric generator, and the fluid expander 105 in the power plant 100 will be significantly more efficient than a stand-alone fluid expander because the fluid expander 105 is arranged in an integral manner with the (already present) reciprocating shaft of the free-piston engine.

Figure 2:
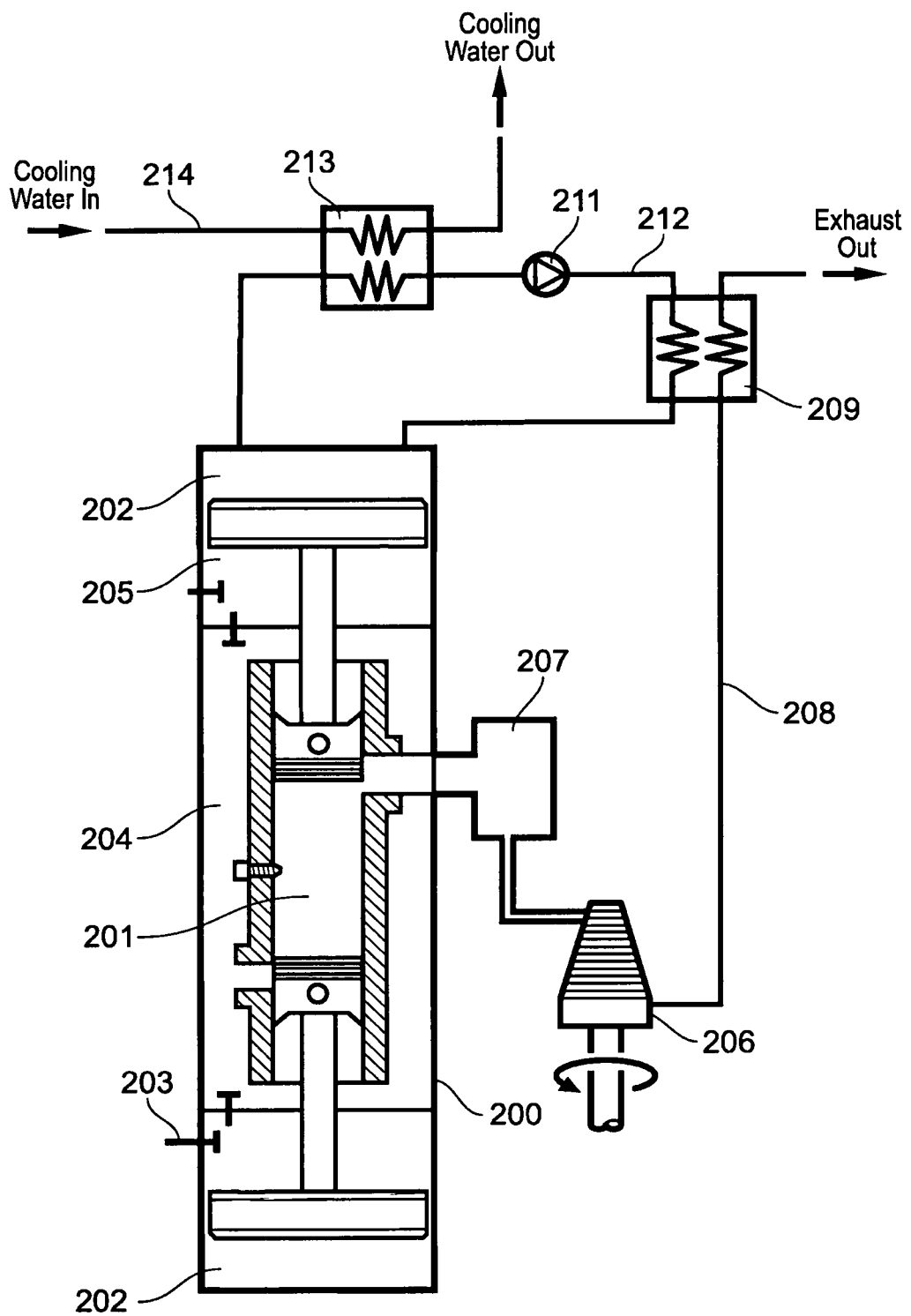
FIG. 2 shows an example of a free-piston engine power plant comprising a gas generator.

FIG. 2 shows a free-piston engine power plant comprising an opposed piston free-piston engine gas generator 200. The gas generator has a combustion chamber 201, a scavenge air box 204, an exhaust gas receiver 207, and a power turbine 206. Each combustion piston assembly is arranged with a bounce chamber 202, intake air valves 203, and a supercharge pump 205. This arrangement will be known to the person skilled in the art.

The embodiment according to FIG. 2 further comprises an exhaust gas channel 208 leading from the power turbine 206 to a heat exchanger 209. From the heat exchanger 209 the exhaust channel is led to an exhaust discharge 210.

A bottoming cycle is provided, also in this example illustrated as a steam cycle. The bottoming cycle comprises a water pump 211, a fluid channel 212 for the bottoming cycle working fluid, whereby the fluid channel leads the working fluid from the water pump 211 through the heat exchanger 209 for receiving heat from the exhaust gases. The working fluid is further led into the bounce chamber 202 of the free-piston engine gas generator 200. From the bounce chamber 202 the working fluid is led back via the fluid channel 212 to a condenser heat exchanger 213 to be cooled by a cooling water stream 214m and to the water pump 211.

Valves (not shown) control the admission and release of working fluid from the bounce chamber 202. The valves control this such that the bounce chamber functions as a regular piston expander. The valves may control the amount of working fluid admitted at any time, and the amount of fluid retained in the bounce chamber, such that the bounce chamber will work partly as a conventional bounce chamber, and partly as an expansion chamber for the working fluid.

Advantageously, this allows part of the exhaust heat to be recuperated and utilised for the compression processes in the free-piston gas generator, thus ultimately increasing the power output through the power turbine 206.

Figure 3:
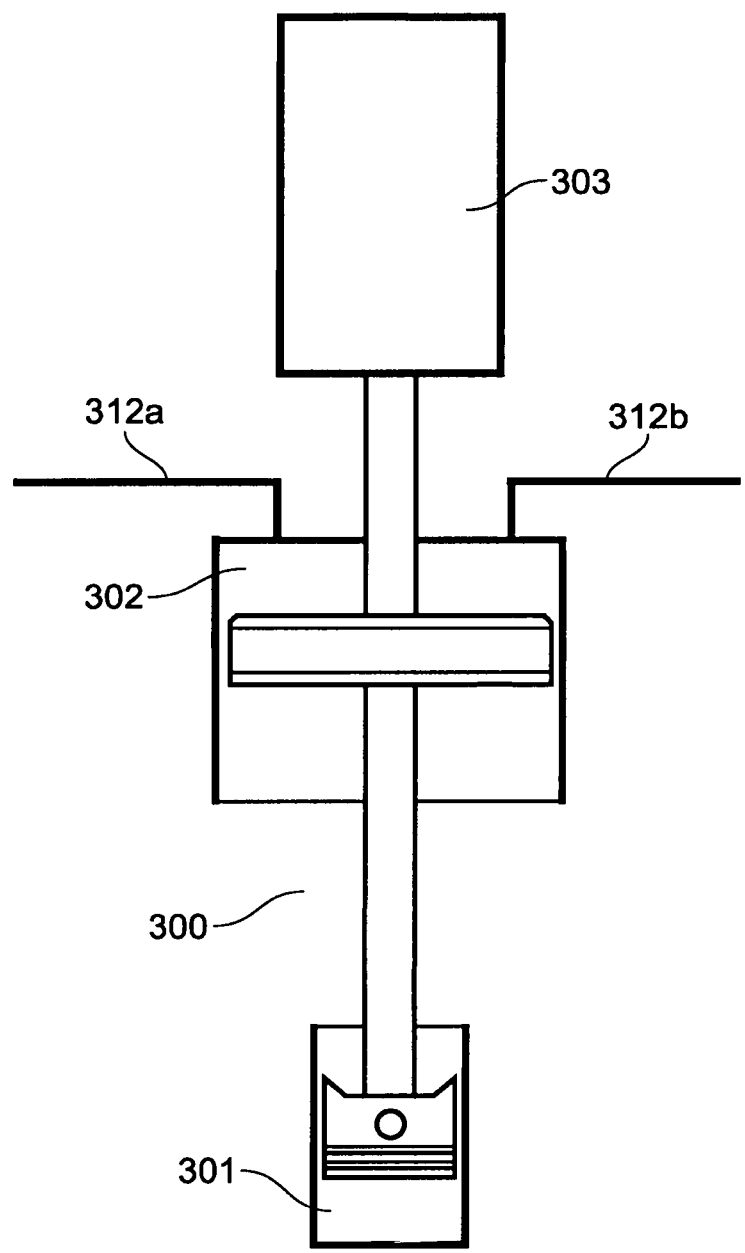
FIG. 3 shows an example of a free-piston engine comprising a combustion chamber.

FIG. 3 shows a free-piston engine 300 having a combustion chamber 301, a bounce chamber 302 and a linear load device 303. The linear load device 303 is a linear electric machine, similar to that described in relation to FIG. 1.

Alternatively, the load device 303 is a hydraulic pump, or a pneumatic compressor cylinder.

Exhaust gases from the combustion chamber 301 are passed through a heat exchanger and used to drive a bottoming cycle (not shown) in an equivalent manner to that described in relation to FIG. 2. The working fluid of the bottoming cycle is led into and discharged from the bounce chamber 302 through pipes 312a and 312b, the pipes 312a and 312b forming part of the fluid channel for the bottoming cycle. Advantageously, this permits the recuperated exhaust gas heat to be extracted directly as electric energy through the load device 303. By utilising the bounce chamber 302 for expansion of the working fluid, a bottoming cycle can be implemented with very low mechanical losses.

Figure 4:
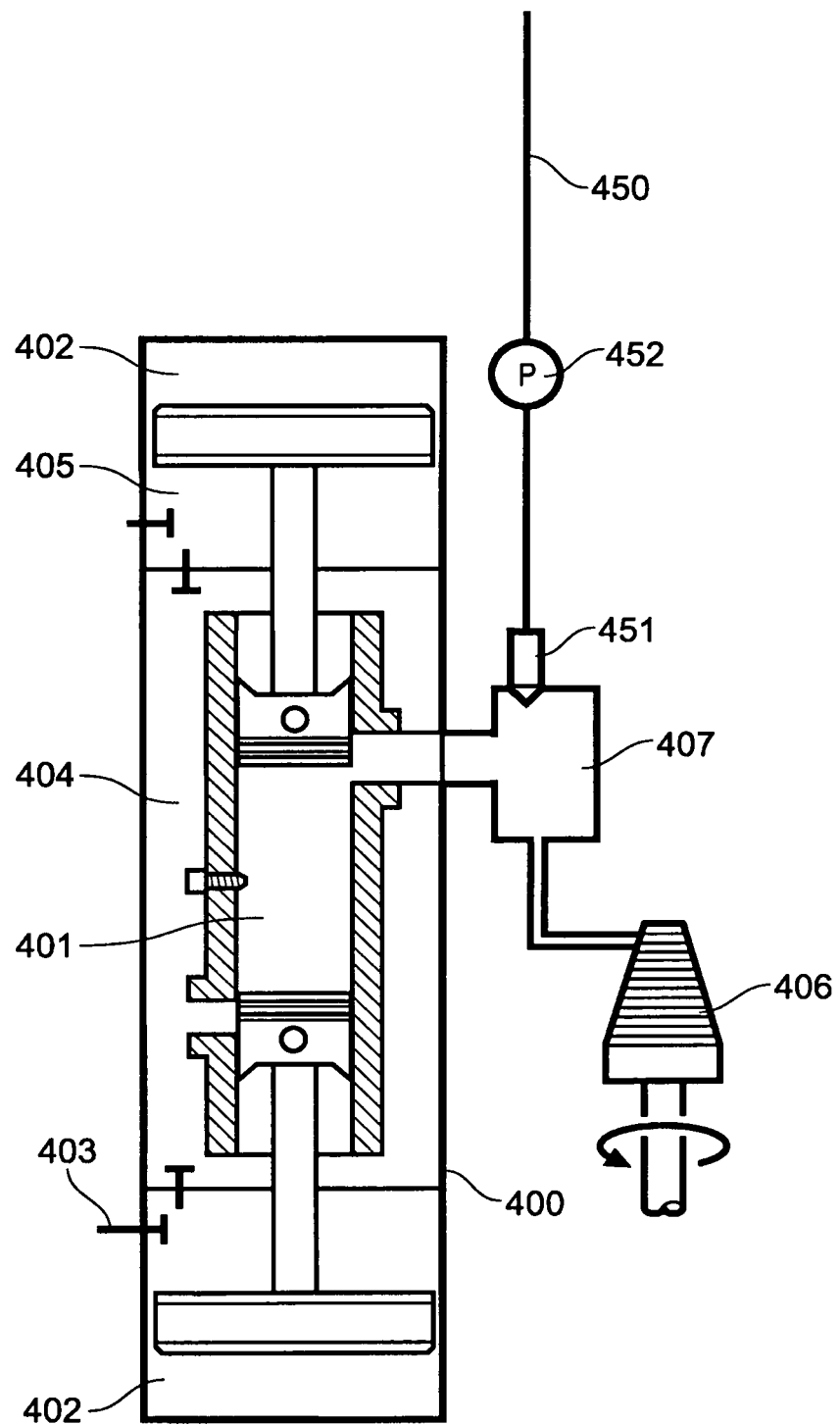
FIG. 4 shows an example of free-piston gas generator power plant.

FIG. 4 shows an opposed piston free-piston engine power plant, comprising a free-piston engine gas generator 400. The gas generator 400 has a combustion chamber 401, a scavenge air box 404, an exhaust gas receiver 407, and a power turbine 406. Each combustion piston assembly is arranged with a bounce chamber 402, intake air valves 403, and a supercharge pump 405.

A challenge with such free-piston engine gas generator power plants is that the reciprocating nature of the free-piston engine creates pulsating exhaust flow conditions.

The power turbine 406 generally has best performance under stable, steady-flow conditions. There is therefore a need to smoothen such variations to a level at which they don't create significant performance degradations in the power turbine.

The free-piston engine gas generator power plant is provided with a water supply 450 with an injection valve 451. A water pump 452 can optionally be used if the water supply 450 does not provide sufficiently high pressure for injection. Water from the water supply 450 is injected into the exhaust gas receiver 407 in a pulsating manner, and at a frequency substantially equal to the flow pulsations in the exhaust from the gas generator 400. (This frequency will generally be the same as the operating frequency of the free-piston engine.) As water is injected into the exhaust gas receiver 407 it will evaporate and thus contribute to increasing the pressure in the exhaust gas receiver 407. By adjusting the phase of the pulsating water injection in relation to the flow pulsations from the free-piston engine, this contribution will be of a pulsating nature and it is possible to reduce or eliminate flow- and pressure variations seen by the power turbine.

Advantageously, only a comparatively small amount of water may be necessary to produce notable effects in the pressure and flow conditions seen by the power turbine, thus the water injection will not negatively influence the performance of the system in any significant way. Preferably, the water is injected at high pressure and through a small-bore nozzle to ensure good atomisation and evaporation. (The exact values will depend on the size of the power plant, however, water injection pressures of several hundred bar, for example above 200 bar, 300 bar or 500 bar, are unproblematic to obtain with standard technology.)

The water injection valve is integral with the nozzle, such as a solenoid-controlled injector.

Figure 5:
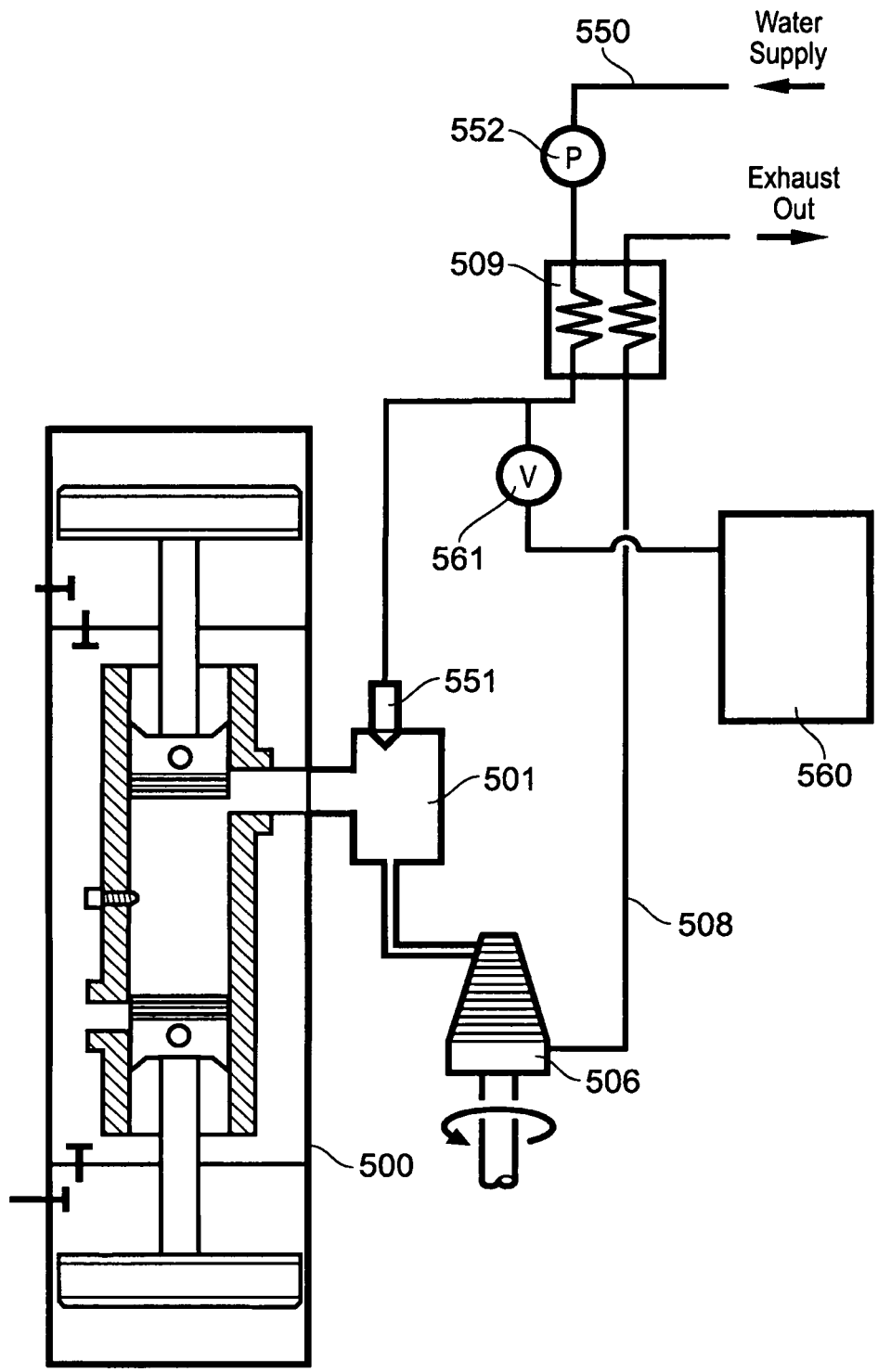
FIG. 5 shows an example of a free-piston generator with steam injection.

FIG. 5 shows a free-piston gas generator 500 equivalent to that shown in FIG. 4 and includes water supply 550. A water pump 552 can optionally be used if the water supply 550 does not provide sufficiently high pressure. A heat exchanger 509 is provided, the heat exchanger 509 receiving exhaust gases from the free-piston gas generator via the exhaust gas channel 508. In the embodiment shown the heat exchanger 509 receives those exhaust gases having exited the power turbine however the heat exchanger may alternatively be positioned in the exhaust channel between the free-piston gas generator 500 and the power turbine 506.

Water from the water supply 550 is led through the heat exchanger 509 to exchange heat with the exhaust gases, thereby producing steam. The steam from the heat exchanger 509 can be led to an injection valve 551 for injection into the exhaust gas receiver 507. This increases the flow rate through the power turbine, thus allowing more electric power to be produced.

Additionally, or alternatively, the steam is injected into the exhaust gas receiver 507 in a pulsating or time-varying manner, with a frequency which is substantially the same as the flow pulsations from the free-piston engine, but with a phase such that the steam, as much as possible, smoothens the pressure- and flow variations seen by the power turbine 506. Thereby the power turbine can work under more stable conditions, giving better performance. Alternatively, the steam may be injected at any other point in the exhaust channel, i.e. anywhere between the free-piston engine 500 and the power turbine 506.

Advantageously, this utilises the exhaust heat, which may otherwise have been lost, to improve the power plant performance and ensure optimum operation and utilisation of the power turbine 506. Ensuring stable operating conditions for the power turbine 506 also improves its lifetime and reduces the need for maintenance.

Alternatively, or additionally, steam from the exhaust gas heat exchanger 509 can be led to a second path leading to a heating circuit 560, for external utilisation of the steam heat. This may, for example, be for space heating in residential or commercial buildings. A valve 561 controls the amount of steam which is led to the heating circuit. The valve 561 may also work in cooperation with the injection valve 551 to control the relative amount of steam which is led to each path. In such a case, the injection of steam into the exhaust gas receiver via injection valve 551 may be done as a pulsating flow, to realise the advantages described above, or with a constant steam injection rate.

Control of the valve 561 and the injection valve 551 provides the significant advantage that the relative amount of power produced can be adjusted with more flexibility than in conventional systems. This has particular advantages in combined heat and power arrangements, as the required heat load and electricity load typically vary significantly. For example, in an operational situation where the electricity demand is high and the heat demand low, all the available steam can be led to the exhaust gas receiver via injection valve 551. This increases the overall flow rate through the power turbine 506, thus allowing more electric power to be produced. Conversely, if the electricity demand is low and the heat demand high, more steam can be led via valve 561 to the heating circuit 560.

The free-piston power plant of certain embodiments may provide significant advantages in that exhaust gas heat (which may otherwise have been lost) can be utilised, and with a significant flexibility such that system operation can be adapted to any given heat- and electricity load demand.

It will be clear to a person skilled in the art that features described in relation to any of the embodiments described above can be applicable interchangeably between the different embodiments. The embodiments described above are examples to illustrate various features of the invention Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A free-piston gas generator power plant comprising:
a free-piston engine;
an exhaust channel;
a power turbine having an exhaust line;
a heat exchanger;
a water supply; and
an injector;
wherein the free-piston engine is configured to supply an exhaust gas to the power turbine via the exhaust channel;
wherein the heat exchanger is coupled to the exhaust line;
wherein the exhaust line is arranged to heat the water supply to create steam; and
wherein the injector is arranged to inject at least a portion of the steam into the exhaust channel.

2. The free-piston gas generator power plant according to claim 1 further comprising an injection valve configured to control the rate of steam injection into the exhaust channel.

3. The free-piston gas generator power plant according to claim 1 further comprising an injection valve configured to inject water into the exhaust channel at a predetermined water injection frequency.

4. The free-piston gas generator power plant according to claim 1 further comprising a water pump configured to increase pressure in the injector.

5. The free-piston gas generator power plant according to claim 1, wherein the injector comprises a nozzle to atomize water being injected into the exhaust channel.

6. The free-piston gas generator power plant according to claim 1, wherein a portion of the steam is diverted to form a second steam path.

7. The free-piston gas generator power plant according to claim 6 further comprising:

a second steam path injector; and
a second steam path valve;
wherein the second steam path injector and valve are provided on the second steam path to control the amount of steam supplied to the second path.

\* \* \* \* \*

UNITED STATES PATENT AND TRADEMARK OFFICE
CERTIFICATE OF CORRECTION

PATENT NO. : 10,871,106 B2
APPLICATION NO. : 15/770208
DATED : December 22, 2020
INVENTOR(S) : Anthony Paul Roskilly and Rikard Mikalsen It is certified that error appears in the above-identified patent and that said Letters Patent is hereby corrected as shown below:

On the Title Page

Column 1 Item (73), after "Assignee:" and before "University of Durham (GB)" Please insert --The--

Signed and Sealed this
Seventeenth Day of May, 2022

Katherine Kelly Vidal
*Director of the United States Patent and Trademark Office*